United States Patent [19]

Wilson

[11] E Patent Number: Re. 32,674

[45] Reissued Date of Patent: May 24, 1988

[54] MULTIPLE WINDINGS ELECTRICAL MACHINES

[76] Inventor: John T. R. Wilson, 736 Lynnhaven La., La Canada Flintridge, Calif. 91011

[21] Appl. No.: 873,127

[22] Filed: Jun. 11, 1986

Related U.S. Patent Documents

Reissue of:

[64] Patent No.: 4,305,027
Issued: Dec. 8, 1981
Appl. No.: 20,341
Filed: Mar. 14, 1979

U.S. Applications:

[63] Continuation of Ser. No. 558,689, Dec. 6, 1983.

[51] Int. Cl.[4] ..... H02K 13/00
[52] U.S. Cl. ..... 318/439; 318/492
[58] Field of Search ..... 310/177, 296, 253; 318/439, 492

[56] References Cited

U.S. PATENT DOCUMENTS

| | | | |
|---|---|---|---|
| 1,840,473 | 1/1932 | Sousedik . | |
| 2,500,571 | 3/1950 | Reynolds . | |
| 2,780,741 | 2/1957 | Lynn et al. | 310/177 |
| 3,348,111 | 10/1967 | Woehler | 318/252 |
| 3,370,191 | 2/1968 | Koch | 310/13 X |
| 3,662,201 | 5/1972 | Madsen | 310/220 |
| 3,906,321 | 9/1975 | Salihi | 318/439 |
| 3,924,169 | 12/1975 | Craft et al. | 318/354 |
| 3,959,705 | 5/1976 | Salihi | 318/439 |
| 4,186,333 | 1/1980 | Kremer | 318/376 |

FOREIGN PATENT DOCUMENTS

| | | | |
|---|---|---|---|
| 655112 | 11/1934 | Fed. Rep. of Germany . | |
| 1309520 | 10/1962 | France . | |
| 903546 | 8/1962 | United Kingdom | 310/221 |

OTHER PUBLICATIONS

Thompson, *Dynamo-Electric Machinery*, (New York 1896), vol. 1, pp. 16–17; 36–41 and vol. 2, pp. 445–465.

*Primary Examiner*—Mark O. Budd
*Attorney, Agent, or Firm*—Nilsson, Robbins, Dalgarn, Berliner, Carson & Wurst

[57] ABSTRACT

A class of electrical machines for converting between electrical energy and mechanical energy and vice versa is disclosed. Each machine has an integral number of repeatable sections and is comprised of a magnetic stator, a magnetic armature, multiple open-circuit armature windings overlapping within each repeatable section, a commutator, multiple brushes bearing on the entire commutator, stator magnetic field of various configurations, and appropriate connections and couplings to electrical and mechanical energy sources and loads. Also disclosed are means for disposing of armature winding energy as a part of the armature windings commutation by dissipating the energy in various locations and dissipators or by recovering the energy for reuse.

25 Claims, 7 Drawing Sheets

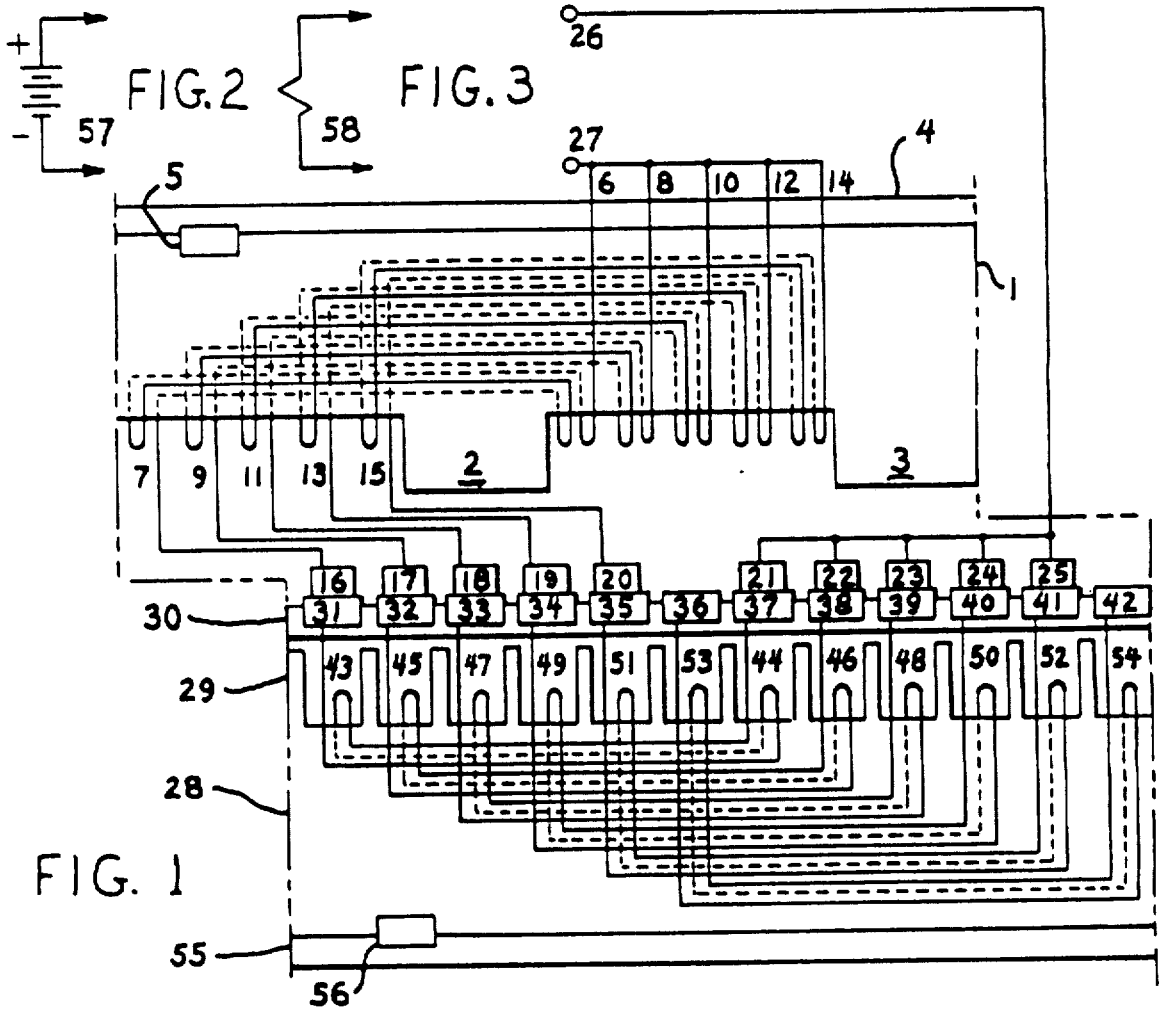
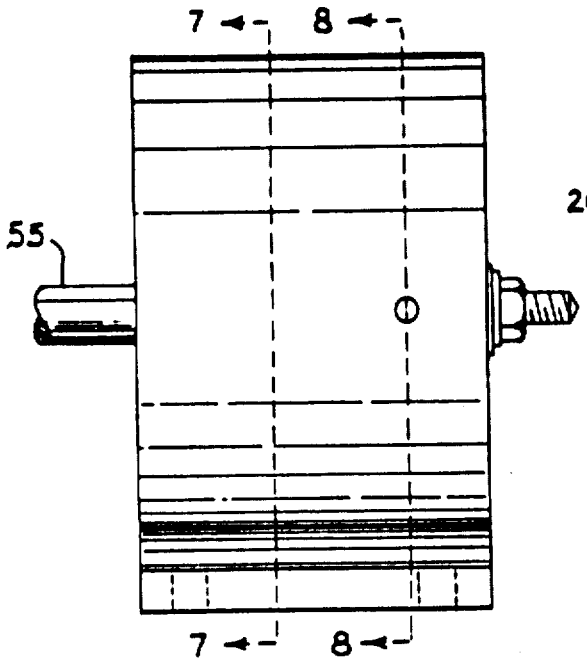
FIG. 4
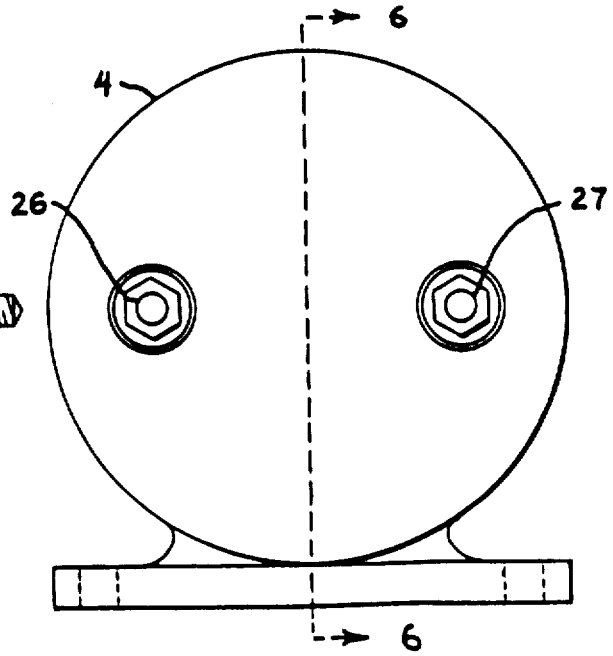
FIG. 5

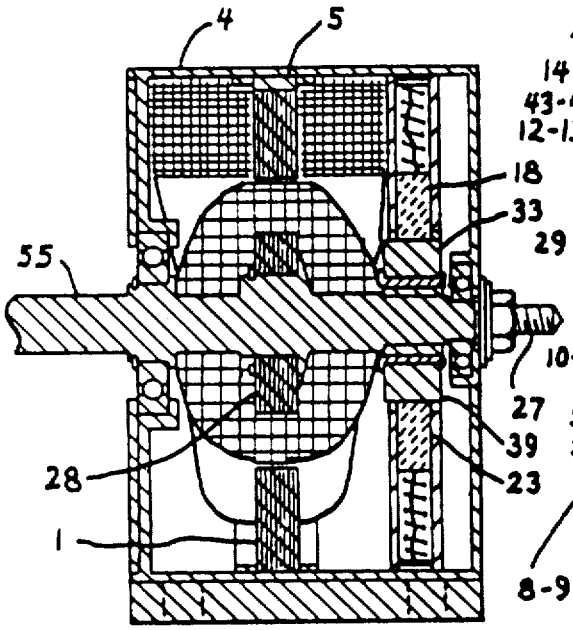
FIG. 6
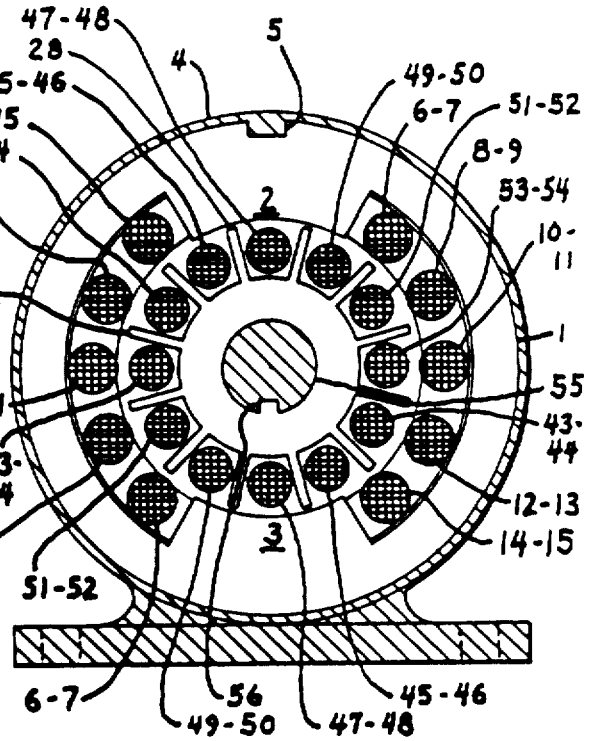
FIG. 7
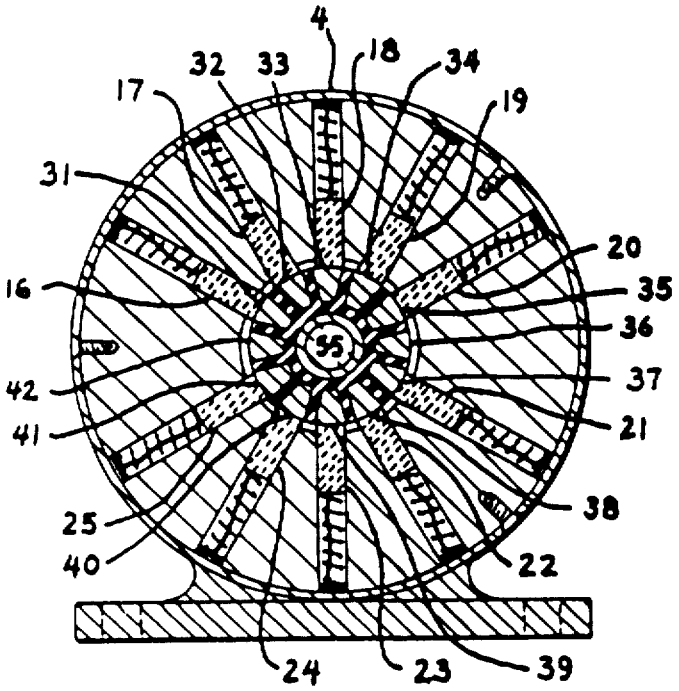
FIG. 8
FIG. 9
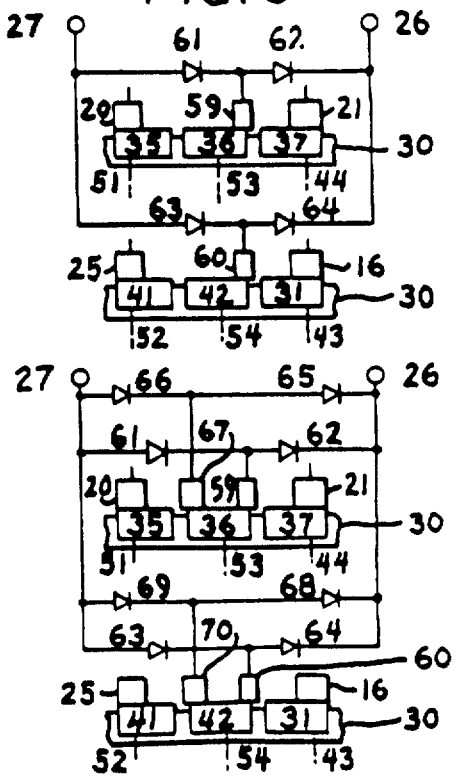
FIG. 10

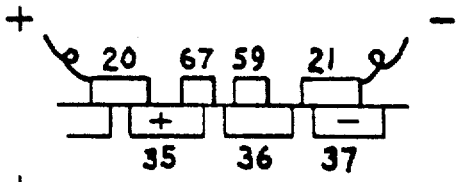
FIG. 17a
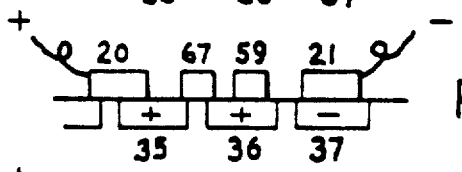
FIG. 17b
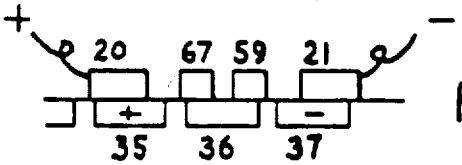
FIG. 17c
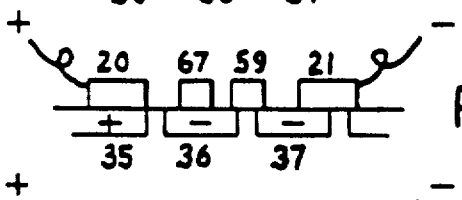
FIG. 17d
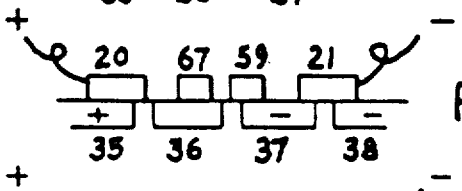
FIG. 17e
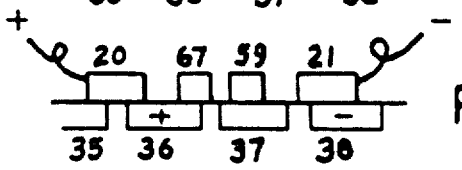
FIG. 17f
FIG. 18
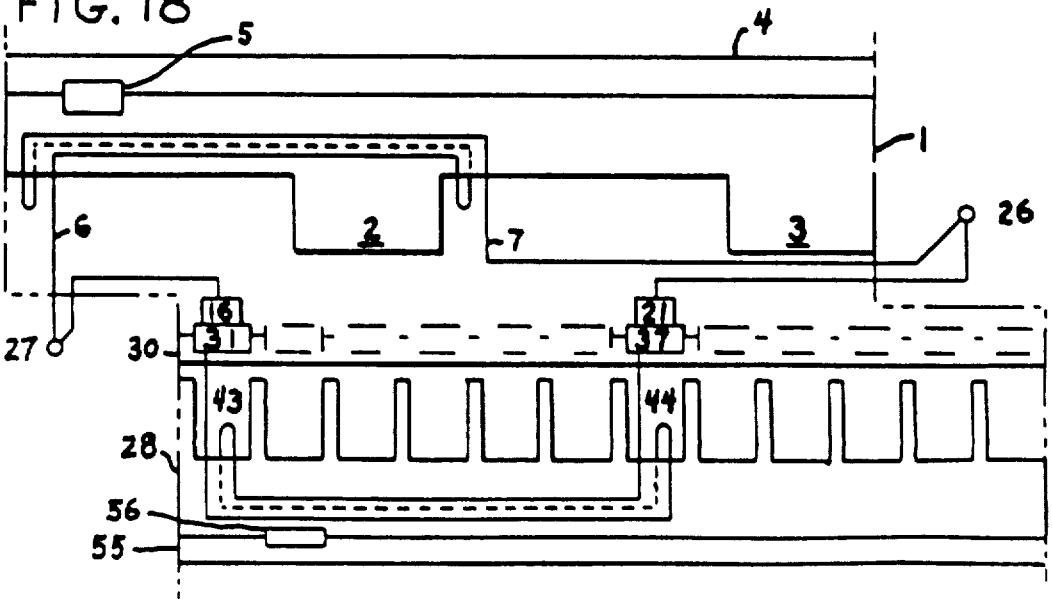

MULTIPLE WINDINGS ELECTRICAL MACHINES

Matter enclosed in heavy brackets [ ] appears in the original patent but forms no part of this reissue specification; matter printed in italics indicates the additions made by reissue.

*This is a continuation of co-pending application Ser. No. 558,689 filed on Dec. 6, 1983.*

This invention relates to electrical machines which have a commutator with two or more brushes per stator pole pair and multiple armature windings per stator pole pair and how these machines are configured to be electric motors or electric generators. Also, this invention concerns linear and rotary electrical machines. In addition, this invention concerns the disposal, by dissipation or recovery, of electrical energy from the commutated armature windings of electrical machines to increase efficiency and performance. The gains expected with this invention are believed suitable for all applications of commutator brush motors.

This invention began as an approach to achieving redundancy in electrical motor windings and other improvements in motor performance and efficiency. The concept that motor efficiency could be improved was put forth by B. M. Oliver in a letter titled "Servo Motor Response" published in the Proceedings of the IEEE, Volume 53, No. 2 (Feb. 1965) pp 201-202. The use of brushes and a commutator was selected for the present invention because it simplified the invention and design of a motor to being only a generator of torque, rather than an electrical transformer and a generator of torque as is required for an AC motor. In an AC motor the output shaft power has to be coupled to the armature by transformer action, whereas in a DC motor the output shaft power is coupled through brushes to the commutator and thus to the armature. The universal motor, DC or AC powered, is a notable exception and is considered part of the class of the present invention.

It is noted that conventional electric motors do not directly generate force and torque comparable to the force generated by a lifting electromagnet or a pressurized fluid hydraulic cylinder of comparable size. While the present invention has not yet been tested to determine how it compares in these matters, it is believed to be capable of greater torque, as a motor, than conventional commutator brush electric motors of comparable size. Torque is developed in a DC motor by the change in total magnetic energy per unit rotation. Thus, the torque can be increased in two ways: (1) by increasing the change in magnetic energy for the same unit rotation, and (2) by decreasing the unit rotation for the same magnetic energy change. The first way is considered to be well exploited since the magnetic change is limited by the characteristics of the magnetic materials and the volume of the magnetic circuit. The present invention uses the magnetic materials to the practical flux densities and discloses how to convert a fixed amount of energy with a reduced per unit rotation. Some practical limitations of the present invention are the [side] *size* of brushes commonly available for use with the commutator; the thickness of one brush is about the minimum circumferential distance that can be used for the per unit rotation or movement. Another practical limitation on per unit rotation is the minimum armature tooth width; these teeth define the sides of armature winding slots and must be wide enough to be sturdy when made in thin armature laminations.

One of the design [limitation] *limitations* on power output from conventional commutator brush motors is that the current density in the brushes must be held low to achieve a reasonable brush life. Maximum brush current densities vary from 55 to 150 amperes per square inch (8.7 to 23 amperes per square centimeter) depending on the brush materials and the application. This present invention allows greater useful brush cross-sectional area on the commutator to couple more energy to and from the armature than a comparable conventional commutator brush motor. Thus, this present invention allows reduced brush current density for a given armature current compared to a conventional commutator brush motor, or the same brush current density as a conventional commutator brush motor and greater total armature current. Operating the brushes with reduced current density reduces the brush heating and prolongs the brush life, given the other factors of brush life are properly controlled. The availability of more brush cross-sectional area on the commutator corresponds to the need for additional electrical power to the armature to generate greater mechanical power than the conventional, similarly sized commutator brush motor.

The sparking or arcing on the commutator at the brushes of conventional commutator brush motors causes wear of brushes and commutator and energy losses and radio interference. Thus, sparking has been a continual problem with these motors which is sought to be avoided or minimized. The present invention proposes to reduce or limit sparking in a unique way. As the current in an armature winding-to-be-commutated is interrupted, the magnetic field due to that current will collapse, and the collapsing magnetic field will generate an inductive kick voltage, which is in reverse polarity to the previously applied voltage. This inductive kick voltage can be dissipated directly or it can be used to establish a voltage sensitive, energy disposal method by dissipation or energy recovery. In this manner commutator brush sparking is eliminated or reduced, and the armature windings are not short-circuited during commutation.

In considering the form that an electrical machine should have, the inactive end-crossings of each winding are only marginal contributors to the magnetic field energy but are full contributors to the resistive losses; thus, winding end-crossings should be minimized. The present invention was conceived with minimum winding end-crossings as a goal. The present invention allows the stator and armature windings pitch to be reduced to reduce end-crossings.

It is theorized that the L/R electrical time constant of this invention will be lower and the response time faster than a conventional commutator brush electrical machine of comparable size; thus, this invention should be more suitable for servomechanism and control motor applications than conventional DC motors. The reason for lower L/R time constant is the windings are individual, parallel windings of a smaller wire size with higher resistance and smaller inductance.

The present invention allows reduced magnetic path lengths and thereby approaches the magnetic structure of high frequency AC motors, such as 400 hertz motors. It has been noted that high frequency AC motors are smaller in size than comparable output-rated 60 hertz or DC motors. It is believed that the present invention allows magnetic path lengths that are comparable with high frequency AC motor magnetic path lengths and thereby allows gains in horsepower-to-weight ratios over conventional DC motors.

BRIEF SUMMARY OF MY INVENTION

This invention is an improved brush-commutator type electrical machine for converting between mechanical and electrical energy. The improved machine includes an integral number of stator pole pairs, and a machine with one stator pole pair is called a repeatable section. The improved machine includes an armature adapted for movement within the machine, a stator disposed adjacent to the armature, a commutator located on the armature comprising a plurality of segments disposed in the direction of armature movement, and a plurality of open circuit armature windings also disposed on the armature and overlapping within a repeatable section in the direction of armature movement. The improved machine also has two groups of brushes in each repeatable section which are held, disposed in the direction of armature movement, by a brushholder so that the two groups of brushes together simultaneously contact the majority of the commutator segments. The first group of brushes contains one or more brushes, and the second group of brushes contains one or more brushes. Each brush in the first brushes group has a corresponding brush in the second brushes group and adjacent brushes groups alternate between first and second. The commutator segments are arranged in pairs within a repeatable section, and each segment of a pair is coupled to a corresponding end of a respective one of the open circuit armature windings. Each brush of a group contacts a portion of the commutator, and the portion includes no less than one commutator segment as the armature moves relative to the stator. Also, as the armature moves relative to the stator certain ones of the commutator segments come out of contact with brushes in first and second groups of brushes and the respective ones of the open circuit armature windings become electrically isolated from these brushes. The improved machine includes means for causing electrical current to flow in open circuit armature windings whose respective commutator segment pairs are contacted by a first brushes group brush and a second brushes group brush, and wherein said current flow in the open circuit armature windings is interrupted as the respective commutator segments move out of contact with said brushes and produce thereby induced voltage between the two commutator segments of pairs coupled to the interrupted open circuit armature windings. The improved machine includes electrical terminals coupled to the machine and adapted to receive electrical energy for the machine and to deliver electrical energy from the machine. The improved machine includes means for disposing of the electromagnetic energy, which is residual in the interrupted open circuit armature windings and made manifest as induced voltage between pairs of commutator segments by dissipating or recovering the energy. One form of the energy disposal means for recovering said electromagnetic energy consists of a plurality of energy disposal brushes in which each disposal brush is located between adjacent groups of brushes and adapted for contacting a commutator segment simultaneously with a brush of a group as the commutator segment comes out of contact with said brush of a group and for sole contact of said commutator segment for at least a portion of the movement of said commutator segment between adjacent groups of brushes, and a half bridge circuit composed of a plurality of diodes which are coupled between each energy disposal brush and the electrical terminals. The diodes are arranged to be back-biased until an open circuit armature winding coupled to the commutator segment contacted by the disposal brush coupled to said half bridge circuit is interrupted and produces thereby induced voltage which forward-biases certain diodes of said half bridge circuit and of the half bridge circuit coupled to the adjacent energy disposal brush contacting the corresponding commutator segment coupled to said interrupted open circuit armature winding, and thereby electromagnetic energy associated with the interrupted open circuit armature winding is recovered and delivered to the electrical terminals. The improved machine includes means whereby adjacent stator poles are energized with opposite polarity magnetomotive force. The improved machine includes means for adjusting the distribution of electrical energy within the machine and for recovering and re-distributing electromagnetic energy within the machine to enhance the conversion between mechanical and electrical energy. This is done by a plurality of stator windings per stator pole pair energizing stator poles wherein each stator winding includes a plurality of portions with two portions in individual series connections with positionally related corresponding first and second brushes group brushes, wherein the first portion winding is connected to a first brushes group brush and the second portion winding is connected to the corresponding second brushes group brush, which series connections are energized by the same current flow as the open circuit armature windings, and which armature windings move with the armature and commutator with respect to said brushes and stator to convert between mechanical and electrical energy using the positional relationship between individual stator windings and individual armature windings established by the corresponding group brush positions when the group brush-contacted portion of the commutator includes at least one commutator segment, and which additionally allows adjusting currents to flow between adjacent commutator segments when the group brush-contacted portion of the commutator includes no less than two adjacent commutator segments, and which thereby achieves energy recovery and energy re-distribution when adjusting currents are interrupted as the respective commutator segments move to reduce to no less than one the number of commutator segments in the group brush-contacted portion of the commutator.

BRIEF DESCRIPTION OF THE DRAWINGS

FIG. 1 is a series field representation of a single stator pole pair repeatable section of an electrical machine in accordance with the present invention. Dotted lines are used to represent stator or armature windings as they pass behind stator or armature magnetic members, respectively, in FIGS. 1, 15, 18, 19, 20, 21, and 22. FIG. 2 shows an electrical storage battery used as an electrical energy source for some configurations of the multiple windings electrical machine as a motor.

FIG. 3 shows a resistive load used to load the multiple windings electrical machine as a generator.

FIG. 4 is a side view of a two-pole, series-field, rotary, electrical machine in accordance with the present invention and which shows the locations of the cross-sections shown in FIGS. 7 and 8.

FIG. 5 is an end view of a two-pole, series-field, rotary, electrical machine in accordance with the present invention and also shown in side view in FIG. 4. FIG. 5 shows the location of a cross-section taken along the armature axis, which is the mechanical energy coupling means axis, and shown in FIG. 6.

FIG. 6 is a cross-section view taken along the armature axis, which is the mechanical energy coupling means axis, of an electrical machine in accordance with the present invention.

FIG. 7 is a cross-section view of an electrical machine in accordance with the present invention, which view is located by FIG. 4 and is taken through the stator and armature magnetic elements including the windings.

FIG. 8 is a cross-section view of an electrical machine in accordance with the present invention, which view is located by FIG. 4 and is taken through the commutator and brushes.

FIG. 9 shows some means to be added to FIG. 1 to achieve energy recovery from an interrupted armature winding with one direction of armature movement.

FIG. 10 shows means to be added to FIG. 1 to achieve energy recovery from an interrupted armature winding for two directions of armature movement.

FIGS. 17a through 17f are a sequential representation of armature winding commutation and the energy disposal brushes operation.

FIG. 18 is a shunt-field representation of an electrical machine in accordance with the present invention.

DETAILED DESCRIPTION OF THE INVENTION

Figure 11:
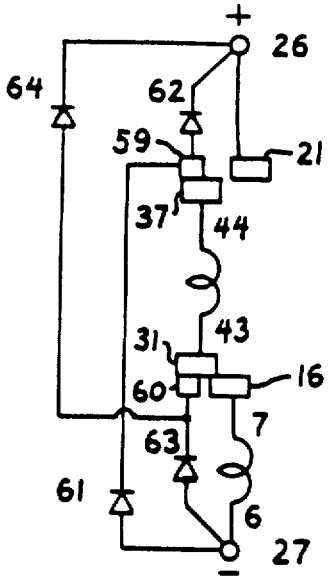
FIG. 11 represents an interrupted armature winding energy recovery circuit in which the preferred brush interrupts the armature winding current.

The multiple windings electrical machine, an electrical machine in accordance with the present invention, will be first described by referring to FIG. 1. The machine comprises a stator and an armature, which are constrained with respect to each other by bearings means to bidirectional movement of the armature along only one axis, which in FIG. 1 is to the left and to the right in the plane of the FIG. 1. The stator comprises a stator magnetic yoke means 1, stator magnetic poles means 2 and 3, structural support means 4, a key means 5 interlocking with the stator magnetic yoke means 1, multiple stator windings shown in FIG. 1 as five windings with ends 6 and 7, 8 and 9, 10 and 11, 12 and 13, and 14 and 15, which are wound around pole 2, spring-loaded brushes 16 through 25, and electrical terminals 26 and 27. Not shown in FIG. 1 is a brushholder means which is considered part of the stator, the brushholder means positions the brushes and spring-loads them against the commutator and insulates the brushes from each other. The armature comprises a magnetic armature 28 with teeth, one of which is 29, regularly spaced at the armature winding pitch, a commutator 30 with conducting commutator segments 31 through 42, multiple overlapping open-circuit armature windings per pole pair attached to and electrically insulated from the magnetic armature 28 and each other and with active edges of each winding spaced one stator pole pitch apart in the direction of allowable movement and the overlapping in the direction of allowable movement confined to each stator pole pair and shown in FIG. 1 as six windings with ends 43 and 44, 45 and 46, 47 and 48, 49 and 50, 51 and 52, and 53 and 54, which are wound in slots between the teeth, a mechanical energy coupling means 55, and a key means 56 interlocking with the magnetic armature 28. The armature is constrained by bearings means, not shown in FIG. 1, which are mounted between the structural support means 4 and the mechanical energy coupling means 55, so that when the armature moves there is an air gap separating the armature from the stator, and particularly separating the magnetic armature means 28 and the stator magnetic poles means 2 and 3. The stator and armature windings are firmly attached to the stator magnetic yoke 1 and the magnetic armature 28 respectively, and are insulated from the stator and armature and each other except as described herein.

The armature and stator windings are preferred to have roughly equivalent magnetic energy, which is the magnetomotive force times the flux density times the volume, to more effectively interact with each other. The number of multiple armature windings is chosen for smoothness of operation, practicality, and convenience. The armature surface is equally divided among the multiple armature windings. The stator poles are made as wide in the direction of movement as two armature winding pitches to reduce cogging. The remaining stator winding space between the stator poles is equally divided among the multiple stator windings for that configuration. There are more armature windings than stator windings shown in FIG. 1 because one armature winding is being commutated. It is recognized that an electrical machine in accordance with the present invention could be configured to have more armature windings than stator windings or more stator windings than armature windings or that there could be no stator windings, as in a permanent-magnet field machine. The commutator 30 has uniformly sized and spaced conducting, commutator segments 31 through 42, which are insulated from the armature mounting and each other. It is preferred that one end of each armature winding be electrically connected to one and only one commutator segment; however, it is recognized that there could be additional commutator segments not connected to any armature winding, and that there could be more than one commutator segment electrically connected to one armature winding end. It is preferred that the number of commutator segments be equal to the number of armature winding ends, and that also equals the number of armature teeth or winding slots or winding positions; it is also preferred that the armature winding ends be connected electrically to the closest commutator segment.

To simplify FIG. 1 and represent the multiple windings electrical machine in one view, the commutator 30 with commutator segments 31 through 42 and brushes 16 through 25 and connecting circuits are shown in an enlarged air gap between the stator magnetic poles 2 and 3 and the magnetic armature 28. The preferred and practical electrical machine construction in accordance with the present invention is shown in FIGS. 4, 5, 6, 7, and 8, wherein the commutator 30 with commutator segments 31 through 42 and brushes 16 through 25 and connecting circuits and brushholder have been removed from the fictitious but simplifying air gap placement to practical locations indicated by the placement of some or all segments of the commutator and some or all brushes.

In the sectional view, FIG. 6, the commutator segments 33 and 39, which are parts of commutator 30, are shown and the brushes 18 and 23 are shown, all removed from the fictitious but simplifying air gap placement of FIG. 1 and placed axially adjacent to the stator magnetic yoke 1 with stator windings in place and the magnetic armature 28 with armature windings in place.

In the sectional view, FIG. 7, the air gaps between stator magnetic poles 2 and 3 and the magnetic armature 28 are shown without the fictitious but simplifying inclusion of commutator 30 with commutator segments 31 through 42 and and brushes 16 through 25 and connecting circuits and brush-holder used in FIG. 1 and other figures.

In the sectional view, FIG. 8, the commutator segments 31 through 42, parts of commutator 30, are shown and the brushes 16 through 25 are shown, all removed from the fictitious but simplifying air gap placement of FIG. 1 and placed axially adjacent to the stator magnetic yoke 1 and held in the structural support 4. The brushes 16 through 25 are shown spring-loaded against the commutator segments and held in a brushholder means.

FIG. 1 shows only one stator pole pair, whereas an electrical machine in accordance with the present invention may be constructed of any practical number of such pole pairs, which are also called repeatable sections; the double-dashed lines in FIG. 1 mark the boundries of this one-pole-pair machine. The repeatable sections are interconnected at the stator magnetic yoke means 1, the structural support means 4, the mechanical energy coupling means 55, the magnetic armature means 28, the commutator means 30, and at the electrical energy connections means, terminals 26 and 27.

Also, FIG. 1 is a linear representation of an electrical machine in accordance with the present invention, which can be, and is more usually, constructed in a circular, concentric cylindrical fashion as a rotary machine. This type of rotary machine is shown in FIGS. 4, 5, 6, 7, and 8 with the magnetic armature 28 attached to and concentric with a mechanical energy coupling means shaft 55, the commutator means 30 attached to and concentric with the mechanical energy coupling means shaft 55, a two-pole magnetic stator concentric around the armature, the stator magnetic yoke means 1 attached to the outer-cylindrical structural support means 4 by key means 5, and the shaft 55 supported and constrained by bearings means attached to the structural support means 4, and the brushholder means concentric around the commutator means 30 and mechanically attached to the structural support means 4.

In operation, the electrical machine in accordance with the present invention utilizes external energy to establish a magnetic field and magnetic flux which links the stator magnetic yoke means 1, stator magnetic poles means 2 and 3, magnetic armature means 28, air gap means, and armature windings means. When connected as a motor, the external energy is supplied by an electrical energy source means such as shown in FIG. 2 as a unidirectional voltage source means 57, a battery; the electrical energy source means may also be an alternating current source when the electrical machine in accordance with the present invention is a universal type motor; some of the external energy may be supplied by a permanent magnet when a permanent magnet is used to replace each stator magnetic pole. When connected as a generator, the external energy is supplied by a mechanical energy source means connected to the mechanical energy coupling means 55 and an electrical load means, such as shown in FIG. 3 as a resistor 58, is connected to terminals 26 and 27. The mechanical energy source means is usually considered as supplying a continuous, single-direction force and velocity.

The FIG. 1 also shows vacancies in the brush means between brushes 20 and 21, and between brush 25 and brush 16, for a one pole pair machine, or the first brush is a repeatable section connected at the right of FIG. 1, for a two-or-more pole pair machine. These vacancies are used to avoid shorting between positive and negative voltages by a brush bridging two commutator segments, and to interrupt the armature current and initiate the energy disposal from an armature winding-to-be-communtated. The brush vacancies divide the brushes into two groups called first brush group means: the brushes 16 through 20, and second brush group means: the brushes 21 through 25.

In contrast with the prior art where open circuit armature windings are not used, the FIG. 1 electrical machine in accordance with the present invention operates as a series-field electric motor as follows. When terminal 26 is made positive and terminal 27 is made negative, such as occurs by connecting to a battery 57 shown in FIG. 2, current flows in series from terminal 26 through brush 21, commutator segment 37, winding 43-44 from end 44 to end 43, commutator segment 31, brush 16, and winding 7-6 from end 7 to end 6 and back to terminal 27. In this manner the windings 44-43 and 7-6 are a force generating set in the position-time instant represented by FIG. 1 which tend to move the magnetic armature 28 to the left in FIG. 1. In a similar manner stator windings 9-8, 11-10, 13-12, and 15-14 will form same-directed force generating sets with armature windings 46-45, 48-47, 50-49 and 52-51 respectively in the position-time instant represented by FIG. 1. As the magnetic armature 28 moves to the left due to the force generated by these sets, stator winding 7-6 will form force generating sets with armature windings 46-45, 48-47, 50-49, 52-51, and 54-53 in sequence. The other stator windings will be similarly and simultaneously forming force generating sets with the armature windings in shifted sequences. After stator winding 7-6 and armature winding 54-53 are a force generated set, winding 7-6 next forms a same-directed force generating set with winding 44-43 again. The reason that the force generated is in the same direction for the second pairing of these two windings after one pole pitch of movement of the magnetic armature 28 is that the direction of current flow in winding 44-43 is now reversed, being from end 43 to end 44, and the position of winding 44-43 now straddles the next stator pole which is of the opposite magnetic field polarity. The reversal of the winding current and the opposite polarity of the magnetic field cause the force generated to be in the same direction. The first mentioned pairing of windings 44-43 and 7-6 is with brush 21 contacting commutator segment 37 making winding end 44 positive with respect to winding end 43, while winding 44-43 straddles stator pole 2; this combination generates a force forcing the magnetic armature to the left in FIG. 1. The second mentioned pairing of windings 44-43 and 7-6 is with brush 16 contacting commutator segment 37 making winding end 44 negative with respect to winding end 43, while winding 44-43 straddles stator pole 3, or a stator pole adjacent to stator pole 2, which is constructed to be of opposite magnetic polarity with reference to stator pole 2. In a similar manner, all the stator windings simultaneously form same-directed force generating sets with all the armature windings, less one being commutated, in shifted sequences using both the first and second mentioned pairing relationships.

The stator and armature windings of each force generating set are positioned with respect to each other so that the total magnetic field energy of the motor will incrementally increase when the energized armature windings move incrementally to the left in FIG. 1. This tendency to increase the magnetic field energy causes force to the left to be generated. The magnitude of the force is proportional to the change in the motor magnetic field energy per unit armature movement; in a rotary motor such as shown in FIG. 4, the force generated is translated into torque, and the torque generated is proportional to the change in motor magnetic field energy per rotational increment. The commutation of the armature windings is designed to maintain the actions of the stator and armature windings described above, by continuously re-establishing these positional relationships, approximately, in spite of magnetic armature 28 movement, and thereby cause a continuous generation of force or torque.

The electrical machine in accordance with the present invention represented in FIG. 1 operates as a series-field generator as follows. The magnetic armature 28 is mechanically driven to the right in FIG. 1 by an external mechanical energy source connected to the mechanical energy coupling means 55. An electrical load such as the resistor 58 of FIG. 3 is connected between terminals 26 and 27. The residual magnetomotive force from the stator magnetic poles means causes magnetic flux to flow across the air gap to the magnetic armature 28 and inductively links the driven armature windings thereby [cuasing] *causing* the initial voltage to be generated in the armature windings 44-43, 46-45, 48-47, 50-49, 52-51, and 54-53. When the initial voltage causes electrical currents to flow through the series stator windings 7-6, 9-8, 11-10, 13-12, and 15-14, the magnetomotive force residual of the stator magnetic poles is increased, and the magnetic flux is thereby increased, and the generated voltage is also increased. After the generator completes the voltage-current transient buildup just described, the generated armature windings voltages, the stator windings currents, and the output voltages between terminals 26 and 27 follow the values to correspond to the generated voltage versus load current characteristics of a series generator. When driven at a constant speed, a series-field generator has a generated voltage versus load current characteristic curve that is humped; that is, at low load current [th] *the* voltage is low, and as the load current is increased the generated voltage increases to a peak, and then as the load current is further increased, the generated voltage decreases to zero.

The first and second pairings of the generator armature windings with stator windings operate as was described for the same-directed force generation of the series-field electric motor to cause the generated voltage from the series-field multiple windings electric generator to be of the same polarity for one direction of mechanical drive. A particular series-field multiple windings electric generator current path in the position-time instant represented by FIG. 1 is with winding end 43 [negative] *positive* and starting at that end 43, to commutator segment 31, to brush 16, to stator winding end 7, through stator winding 7-6 to winding end 6, to terminal 27, through an electrical load, such as resistor 58 of FIG. 3, attached between terminals 27 and 26, to terminal 26, to brush 21, to commutator segment 37, to winding end 44 which is [positive] *negative*, and through winding 44-43 to end 43. The electromotive force driving this current is the voltage generated in the armature winding 44-43. In a similar manner the other armature and stator windings form generating sets and contribute voltage and current to the electrical load connected across terminals 27 and 26.

As the magnetic armature 28 of a multiple windings electric generator of FIG. 1 is driven to the right, armature winding 44-43 forms a voltage generating set with stator windings 7-6, 9-8, 11-10, and 13-12 in sequence. Then the armature winding 44-43 has its current interrupted by the brush vacancy means and the interrupted armature winding energy disposal takes place; *this* energy disposal will be described below. Then the armature winding 44-43 is idle, not connected to any stator winding, in the position occupied by winding 54-53 in FIG. 1. After the idle period, winding 44-43 next forms a same-polarity voltage generating set with stator winding 7-6 for a second pairing. The reason the voltage is of the same polarity for the second pairing of these two windings after one stator pole pitch of armature movement is that the armature winding ends are reversed, end 43 connected to commutator segment 31 now contacts brush 21 and end 44 connected to commutator segment 37 now contacts brush 16, and the position of winding 44-43 now straddles the next stator pole, which is opposite in magnetic field polarity to stator pole 2. The reversal of the winding ends and the opposite polarity of the magnetic field cause the voltage [some] *same* polarity as the first pairing.

The movement of the magnetic armature 28 and commutator 30 causes the brushes to overlap and contact two commutator segments each for a portion of the operating time. When this occurs all the armature windings and all the stator windings are each paralleled by interconnections through the brushes and commutator segments; however, the winding inductances and brush voltage drops tend to maintain the same current through each winding that existed prior to the paralleling. Also, because of this overlapping contact the current through the armature windings is not interrupted until armature winding commutation begins after each stator-pole-pitch of armature movement.

The electric current in an individual armature winding is reversed twice during an armature movement as described under two stator poles. As the first step in the current reversal, the current is interrupted. The aggregate mechanisms for causing these current interruptions are called armature windings connections interruptions means; in FIG. 1 these means are the absence of brushes over commutator segments 36 and 42, which are more properly called brush vacancy means, since there is a space in the regular placement of brushes between brushes 20 and 21 and between brush 25 and the first brush in the next repeatable section, or brush 16 in a single repeatable section machine. When the armature winding current is interrupted, the stored magnetic energy associated with the interrupted armature winding and the current in that winding causes an inductive kick voltage to be generated, which appears at the ends of the interrupted armature winding, and is of opposite polarity to the voltage that caused the current flow in that winding.

ENERGY DISPOSAL AND DISSIPATION

The energy in the interrupted armature winding can be disposed of by dissipating it or by recovering it for re-use. The energy can be dissipated in the armature, in the stator, or external to the multiple windings electrical machine by making a suitable selection of dissipating devices and electrical connections. The various types of energy dissipating devices considered are: resistors, back-to-back zener diodes, back-to-back selenium clipper diodes, varistors, and series resistor-capacitor combinations. To dissipate the interrupted armature winding energy in the armature, add an energy dissipating device from one end of the armature winding to the other end, which is from one commutator segment to another; connect one such energy dissipating device across every armature winding. If back-to-back zener diodes are used with zener voltages greater than the electrical energy source voltage or the generated voltage, there will be no dissipation in the back-to-back zener diodes attached across every armature winding during normal operations; energy dissipation will only occur when the armature winding voltage exceeds the normal voltage because of the inductive kick voltage generated when the current is interrupted.

ENERGY DISSIPATION

To dissipate the interrupted armature winding energy in the stator, add an energy disposal brush in each brush vacancy. This added energy disposal brush per brush vacancy should be narrower than one-half a commutator segment width in the direction of allowable movement, and the energy disposal brush should be offset in the direction of allowable movement within the brush vacancy. The offset from each brush vacancy center should be opposite to the direction of commutator movement, which is toward the approaching commutator segment. One energy disposal brush per brush vacancy will function for one direction of commutator movement; for two directions of commutator movement, add two such energy disposal brushes with opposite offsets within each brush vacancy means. Between each adjacent, correspondingly offset, energy disposal brush, including the adjacent energy disposal brushes in adjacent pole-pair, repeatable sections, connect an energy dissipating device.

To dissipate the interrupted armature windings energy external to the multiple windings electrical machine use a modification of the dissipation-in-the-stator means by adding electrical connections from the energy disposal brushes to externally located energy dissipating devices.

ENERGY RECOVERY

Figure 12:
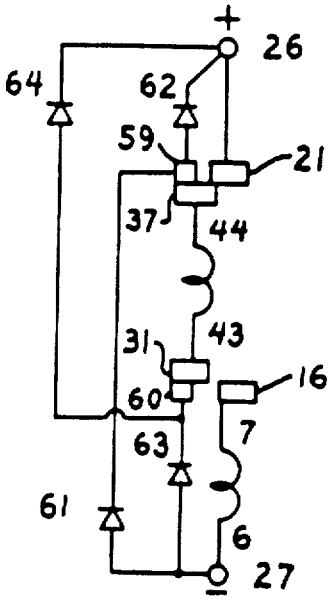
FIG. 12 represents an interrupted armature winding energy recovery circuit which is down-graded to an energy dissipation circuit because the non-preferred brush interrupts the armature winding current.
Figure 13:
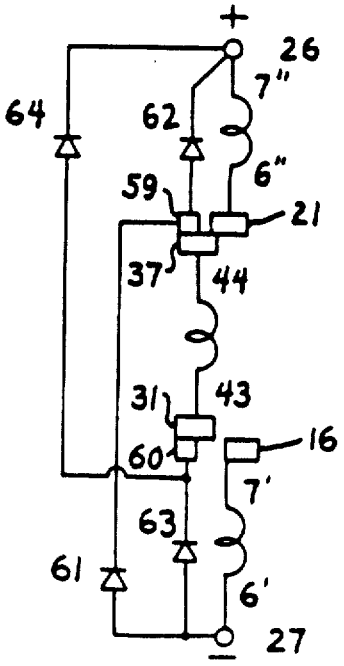
FIG. 13 represents an interrupted armature winding energy recovery circuit which is insensitive to which brush interrupts the armature winding current.

The recovery of energy from interrupted armature windings is believed to be a new concept, and one which will improve the efficiency of electrical machines. The FIGS. 9, 10, 11, 12, and 13 help to explain this concept as it is achieved with the present invention. To recover the interrupted armature windings energy for re-use, place energy disposal brushes means in the brush vacancy means as previously described, connect energy recovery diodes between each energy disposal brush and the positive and negative terminals of a unidirectional voltage source, and make provisions for directing the energy available from the interrupted armature windings to a desired usage or storage, rather than allowing the energy to be dissipated. The provisions for recovering energy are: (1) establish the positions of the brushes adjacent to the brush vacancy means to know by design which brush of the two brushes making electrical connections at opposite ends of the armature winding-to-be-commutated will interrupt that armature winding current, or use a split series-field configuration such as shown in FIG. 13, which recovers energy regardless of which brush interrupts the armature winding current, (2) place an inductance such as series-field stator windings means between the last electrical brush connection, of the two brush connections capable of interrupting the current, and the positive or negative unidirectional voltage source means terminals, and (3) make the recovery of energy occur in the brief time available before the armature winding is energized with a reversed current.

FIG. 9 is a representation of additions and modifications to FIG. 1 to accomplish energy recovery from an interrupted armature winding for commutator 30 movement to the left in FIG. 1; spark reduction on the commutator 30 surface will also be accomplished hereby. The FIG. 1 additions shown in FIG. 9 are energy disposal brushes 59 and 60 and energy recovery diodes 61, 62, 63, and 64. The FIG. 1 modifications shown in FIG. 9 are reductions in the size of the brushes 16, 20, 21, and 25, and re-positioning of brushes 16 and 21; these brushes are all adjacent to the brush vacancy means. The brushes 16, 20, 21, and 25 and energy disposal brushes 59 and 60 are reduced in thickness in the direction of commutator 30 movement, to prevent shorting from brush 20 to a commutator segment to energy disposal brush 59 to another commutator segment to brush 21, and from brush 25 to a commutator segment to energy disposal brush 60 to another commutator segment to brush 16, regardless of the commutator 30 position. The re-positioning of brushes 16 and 21 is to make brush 21 interrupt the armature winding current rather than brush 16. The brush 21 interrupting the armature winding current is represented in FIG. 11. By having brush 21 interrupt the armature winding current, the energy recovery circuit is from the brush 59, through diode 61 to terminal 27, from terminal 27 there are two parallel circuits: (1) through the unidirectional voltage source or resistive load connected across terminals 27 and 26 to terminal 26, then through diode 64, and returning to brushes 60 and 16, or (2) through stator winding 6-7 to brushes 60 and 16. Because of the transient nature of the energy recovery inductive kick voltage from the interrupted armature winding, it is expected that the current circuit through the unidirectional voltage source or resistive load would get most of the energy.

The energy disposal brushes, the brushes adjacent to the brush vacancy means in both directions, and the gaps between them are configured to recover energy and to prevent shorting between the brushes on opposite sides of the brush vacancy means for leftward movement of the commutator 30. Each of the energy disposal brushes has two energy recovery diodes electrically connected to it, and these energy recovery diodes are designated 61, 62, 63, and 64 in FIG. 9. For the sake of the following explanation, consider FIG. 9 as a portion of a two-pole, rotary, electric motor in accordance with the present invention and as shown in FIGS. 4 through 7; so that, when commutator segment 31 moves to the left with the commutator 30 and the magnetic armature 28 due to motor torque, it next contacts energy disposal brush 60, and similarly, as commutator segment 37 moves to the left, it next contacts energy disposal brush 59. FIG. 9 shows only two portions of the commutator 30 of FIG. 1. The commutator 30 portions shown in FIG. 9 include commutator segments at the ends of an armature winding which is being commutated. The two commutator 30 portions are shown in FIG. 9 in two levels, one above the other. The commutator segments, the energy disposal brushes, the brushes adjacent to the energy disposal brushes, and the spaces between all these are also configured so that commutator segments 31 and 37 are contacting energy disposal brushes 60 and 59 respectively prior to losing contact with brushes 21 and 16 respectively. This contact with the energy disposal brushes simultaneous with contact with both brushes 21 and 16 has no effect on the electrical machine operation because the energy recovery diodes 61, 62, 63, and 64 are back-biased by the voltage at terminals 26 and 27 so each energy recovery diode is a very high impedance. It is when the commutator segments 31 and 37 move farther to the left and lose contact with brush 21 or brush 16 or both that the energy recovery diodes may be forward-biased. These three possible conditions of losing contact will be described as they relate to the sequence of interrupting the armature winding current and energy recovery operation. These three conditions might be individually established by design or occur due to manufacturing tolerances or operating wear.

The preferred condition of interrupting armature winding current to achieve energy recovery for the series-field motor of FIG. 1 is to have brush 21 lose contact with commutator segment 37 prior to brush 16 losing contact with commutator segment 31. This condition is shown in FIG. 11. The brush 21 loss of contact with commutator segment 37 interrupts the current flowing in armature winding 43-44; this current interruption induces a large inductive kick voltage in armature winding 43-44, which voltage is of opposite polarity to the voltage which caused the armature winding current flow; this opposite polarity voltage makes commutator segment 37 and energy disposal brush 59 negative with respect to both terminals 26 and 27, which forward biases energy recovery diode 61, thereby supplying to terminal 27 negative polarity energy until the stored magnetic energy of armature winding 43-44 can no longer maintain a negative potential at energy disposal brush 59 with respect to terminal 27.

The non-preferred condition of interrupting armature winding current to achieve energy recovery for the series-field motor of FIG. 1 is to have brush 16 lose contact with commutator segment 31 prior to brush 21 losing contact with commutator segment 37. This condition is shown in FIG. 12. If this occurred in the series-field motor of FIG. 1 with the energy recovery additions and modifications of FIG. 9, there would be no energy recovery, but only energy dissipation. These conditions would cause the inductive kick voltage to be induced in the opposite polarity to the voltage which caused the armature winding current flow; this inductive kick voltage makes commutator segment 31 positive with respect to commutator segment 37, which is still connected, at this instant, to brush 21. Energy disposal brush 60 is thus positive with respect to both terminals 26 and 27, which forward biases energy recovery diode 64, thereby completing a short-circuit of the armature winding 43-44, and causing the magnetic energy to be dissipated in the resistance of the short-circuit.

An unlikely, preferred condition of interrupting armature winding current to achieve energy recovery for the series-field motor of FIG. 1 is for brushes 16 and 21 to simultaneously lose contact with commutator segments 31 and 37. These losses of contact will interrupt the current flowing in armature winding 43-44; this current interruption will induce a large inductive kick voltage in armature winding 43-44, which is of the opposite polarity to the voltage which caused the current flow; this opposite polarity voltage makes commutator segment 37 and energy disposal brush 59 negative and commutator segment 31 and energy disposal brush 60 positive; thus, energy disposal brush 59 will be more negative than terminal 27 and forward bias energy recovery diode 61, and energy disposal brush 60 will be more positive than terminal 26 and forward bias energy recovery diode 64. These forward-biased energy recovery diodes 61 and 64 will establish a low-impedance circuit for returning the magnetic energy of armature winding 43-44 to terminals 26 and 27 for re-use or storage, and the diodes 61 and 64 will remain forward-biased until the magnetic energy of the armature winding 43-44 can no longer maintain the forward-biasing inductive kick voltage. Note that the preferred and non-preferred energy recovery conditions could change into this unlikely-preferred condition by having the remaining commutator segment contact with the brushes 16 or 21 also interrupted.

FIG. 10 is a representation of additions and modifications to FIG. 1 to accomplish energy recovery from an interrupted armature winding for commutator 30 movement to the right or to the left in FIG. 1. FIG. 10 shows only the two portions of the cummutator 30 which relate to the commutator segments connected to the ends of an armature winding-to-be-commutated. The two commutator 30 portions are shown in two levels, one above the other. FIG. 10 is similar to FIG. 9; FIG. 10 has the following additional elements over FIG. 9: two more energy disposal brushes 67 and 70 in each brush vacancy means and energy recovery diodes 65, 66, 68, and 69. These elements operate as has been described for FIG. 9, except these additional elements add the ability to recover energy for commutator 30 movement to the right. Also, note the added energy disposal brushes 67 and 70 are offset to the other side of the brush vacancy means from brushes 59 and 60, to perform their function for right-ward movement of the commutator 30.

The energy recovery diodes 62, 63, 66, and 68 perform an energy recovery function similar to energy recovery diodes 61, 64, 65 and 69 and provide spark reduction when the interrupted armature winding voltage oscillates because of a self-resonant circuit or because of brush bounce after the armature winding current is first interrupted.

The FIG. 13 represents a multiple windings electrical machine configuration with split, series-fields connected on the positive and negative sides of the armature windings to allow energy recovery regardless of whether brush 21 or 16 interrupts the armature winding current. This split series-fields connection of stator windings prevents short-circuiting the interrupted armature winding, and thus prevents the energy dissipation associated with such short-circuiting.

Figure 14:
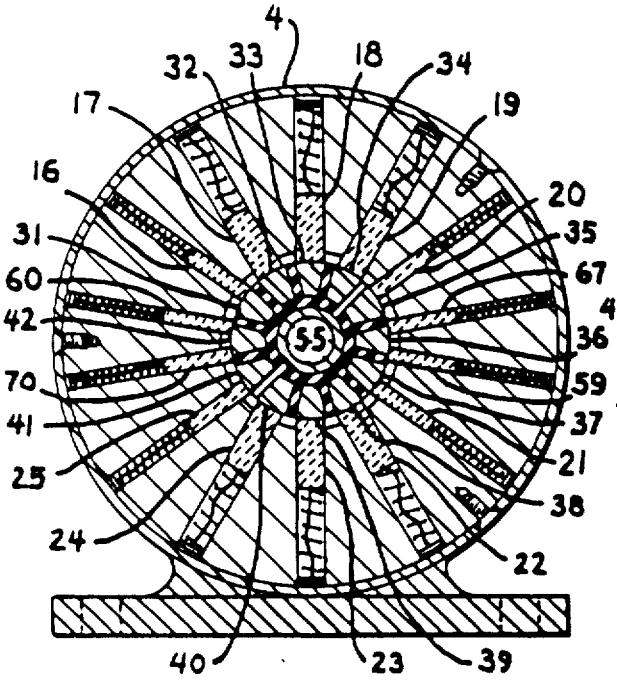
FIG. 14 is a cross-section view similar to FIG. 8 with the addition of energy disposal brush means shown in FIG. 10.

FIG. 14 is a cross-section view through the brushes and commutator of a two-pole, rotary electrical machine in accordance with the present invention and similar to FIG. 8, except with energy disposal brushes means in accordance with FIG. 10.

Figure 15:
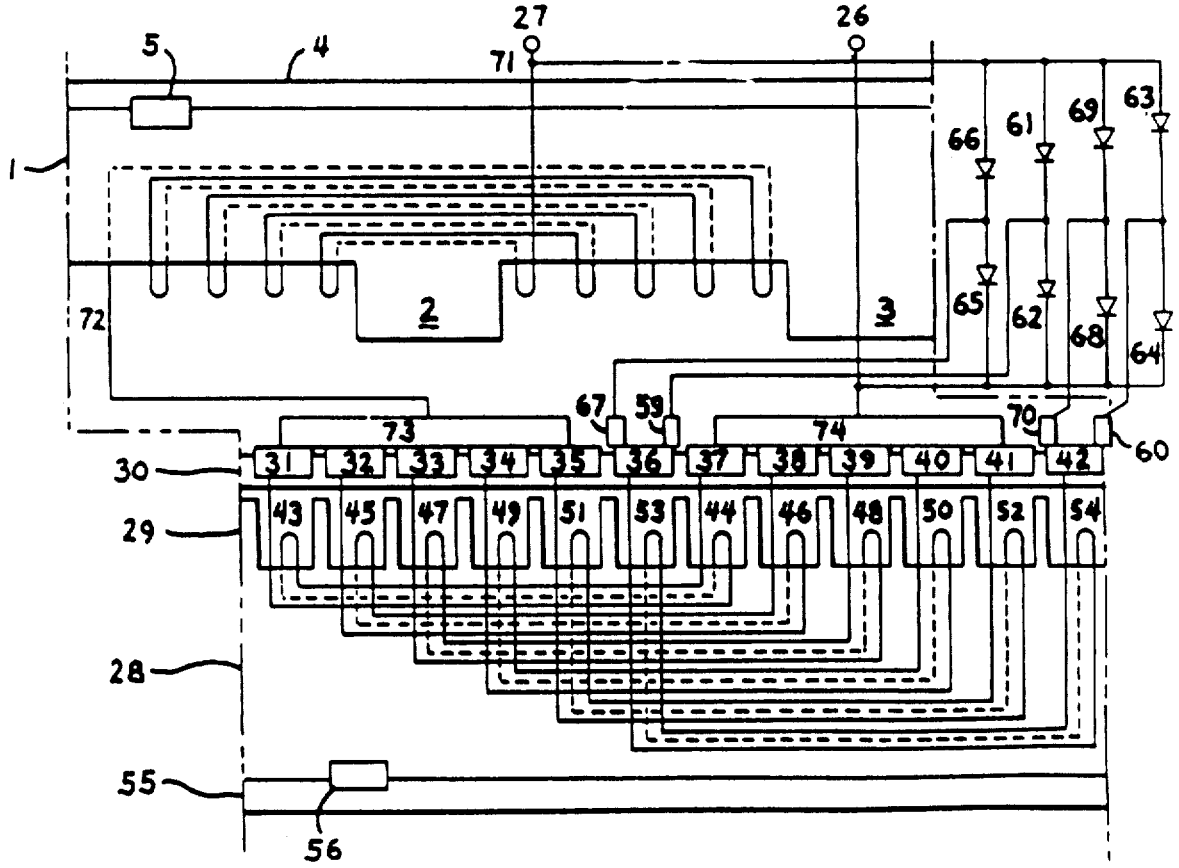
FIG. 15 is a series-field representation of a multiple windings electrical machine with two brushes per stator pole pair plus energy disposal brushes means in accordance with FIG. 10.

FIG. 15 is a series-field representation of an electrical machine in accordance with the present invention and with two brushes per pole pair plus energy disposal brush means in accordance with FIG. 10. The same figure simplifications of showing the commutator, brushes, and electrical connections in an enlarged air gap are used in FIG. 15 as in FIG. 1. Also, the simplification of showing one pole-pair repeatable section to represent any practical number of such repeatable sections is used; the double-dashed lines mark the ends of one repeatable section. The FIG. 15 two-brush configuration is considered useful for multiple pole-pair repeatable section machines with very small stator pole pitch dimensions. In such cases using the FIG. 1 configuration, the practical widths of the brushes become the limiting factors. Also, the FIG. 15 configuration is considered a simplification of the machine of FIG. 1, by reducing the number of brushes and stator windings. FIG. 15 has only one stator winding 71-72 per stator pole pair. Brush 73 takes the place of brushes 16 through 20 of FIG. 1, which are the first brush group means, and brush 74 takes the place of brushes 21 through 25 of FIG. 1, which are the second brush group means.

Figure 16:
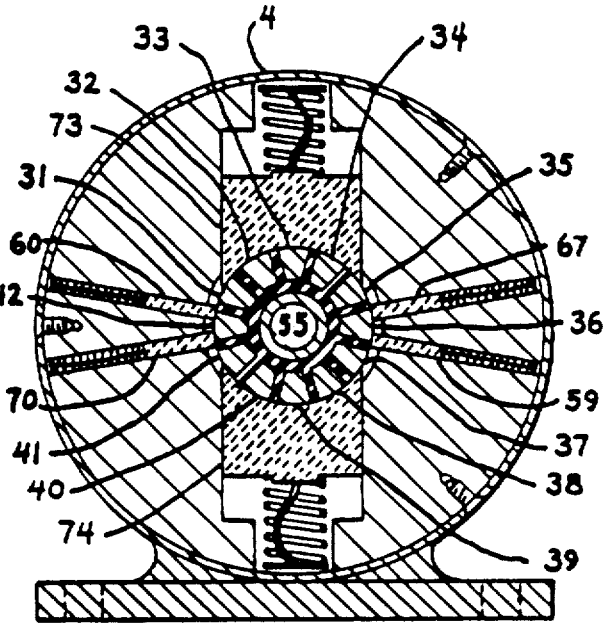
FIG. 16 is a cross-section view similar to FIG. 8 but showing a two-pole electrical machine in accordance with FIG. 15.

FIG. 16 is a cross-section view through the brushes and commutator of a two-pole, rotary, electrical machine in accordance with the present invention and similar to FIG. 14, except with two brushes, 73 and 74, per pole pair plus energy disposal brushes in accordance with FIG. 15. When this configuration is made with multiple pole-pair repeatable sections, the brushes 73 and 74 will have less cusp pointing than shown in FIG. 16, because the brush width in the direction of commutator movement will be smaller fraction of the commutator diameter. Thus, the brushes for a multiple repeatable section configuration will be more rugged.

The series of FIGS. 17a through 17f represent the action of energy disposal brushes 59 and 67 and brushes 20 and 21 against the commutator 30 and the commutator segments 35, 36 and 37 to avoid short-circuits between brushes 20 and 21 during armature movement of one armature winding pitch. These FIGS. 17a through 17f represent actions at one end of armature winding 43-44; the actions at the other end of armature winding 43-44 are similar. Through this sequence of figures it is possible to see that the energy disposal brushes 59 and 67 assume the potentials of both the first brush group brushes and the second brush group brushes at various position-times but never simultaneously, thus they do not allow short-ing between first and second brush group brush potentials, and that at the position-time of interruption of current through armature winding 43-44 between FIGS. 17e and 17f, only the energy disposal brush 59 is in contact with the commutator segment 37. In FIGS. 17a through 17c the commutator segment 37 is connected to the positive connected brush 21 only. In FIGS. 17d and 17e the commutator segment 37 is contacted by the brush 21 and energy disposal brush 59. In FIG. 17f the commutator segment 37 is contacted only by the energy disposal brush 59. In FIGS. 17b, 17d, and 17f, the commutator segment 36 is energized negative, then positive, then negative; if these energizations were not separated by the non-energized intervals shown in FIGS. 17c and 17e, it might be possible to short-circuit between brushes 20 and 21, but the brushes 20, 21, 59, and 67 configurations do not allow short-circuiting between brushes 20 and 21.

FIG. 17a is the same as FIG. 17f except the commutator segments and commutator are all shifted to the left by one armature winding pitch. By inference then, commutator segment 37 in FIG. 17f can be considered to be in the position occupied by commutator segment 36 in FIG. 17a, and thus the subsequent voltages applied to commutator segment 37 can be deduced.

Figure 19:
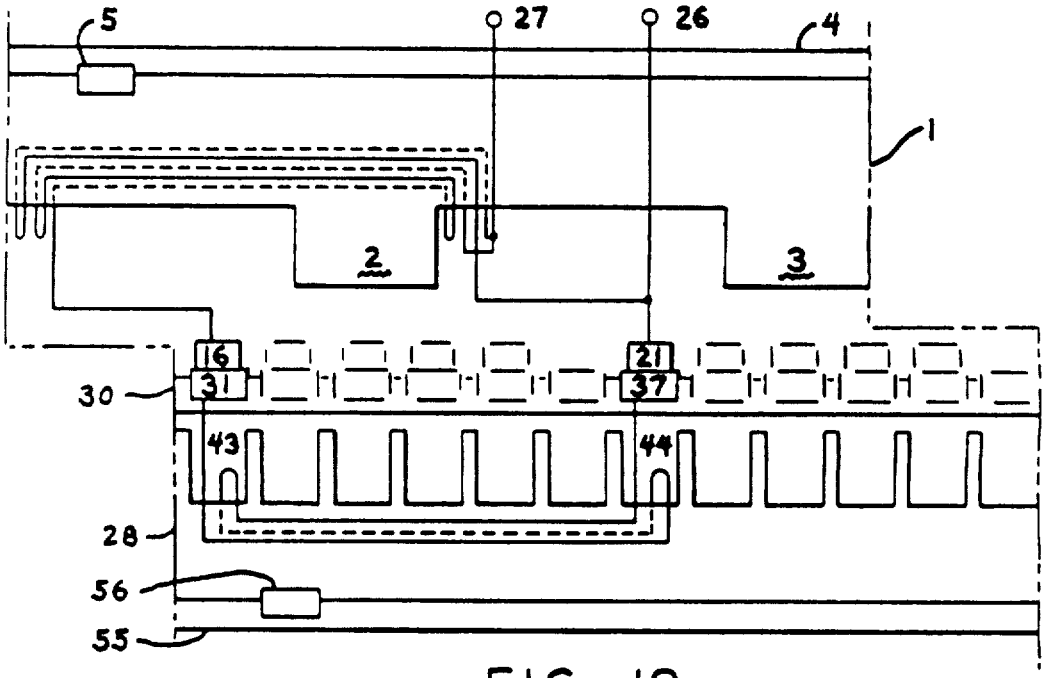
FIG. 19 is a representation of a long-shunt compound field electrical machine in accordance with the present invention.
Figure 20:
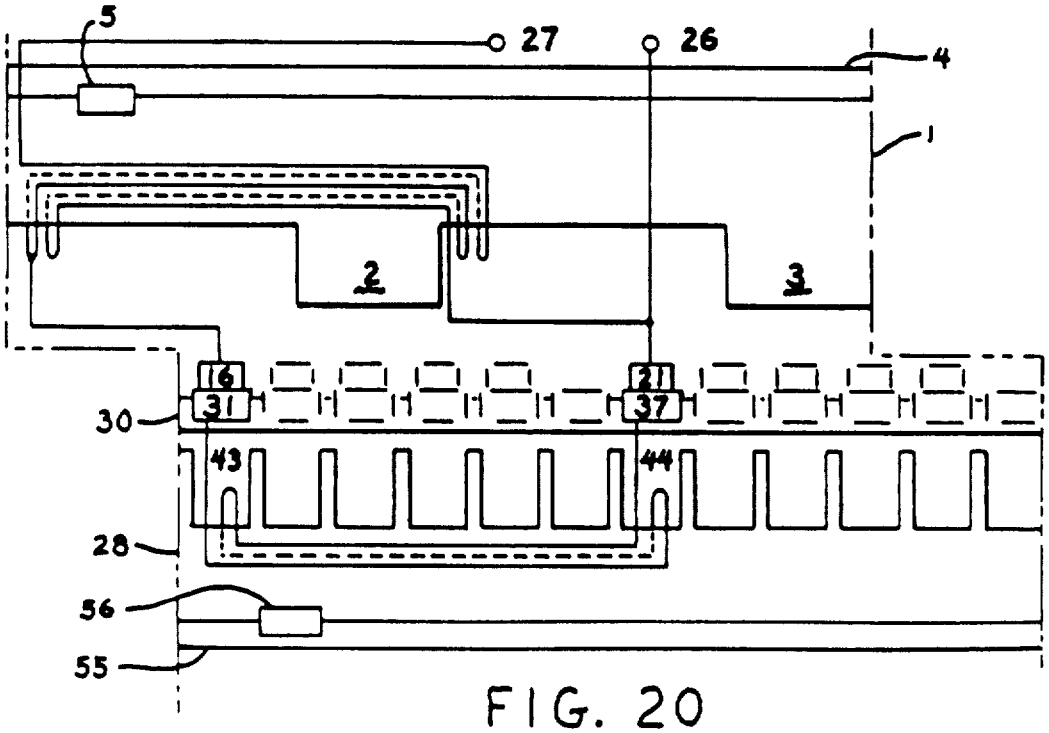
FIG. 20 is a representation of a short-shunt compound field electrical machine in accordance with the present invention.

FIGS. 18, 19 and 20 are representations of shunt-field, long-shunt compound field, and short-shunt compound field electrical machines in accordance with the present invention and using the same assumptions and simplifications as stated for FIG. 1, plus the further simplifications for drawing purposes from FIG. 1of showing only one of five of the stator windings, one of six of the armature windings, the associated commutator segments and brushes, and the stator magnetic yoke means 1, the stator magnetic poles means 2 and 3, and magnetic armature means 28.

Figure 21:
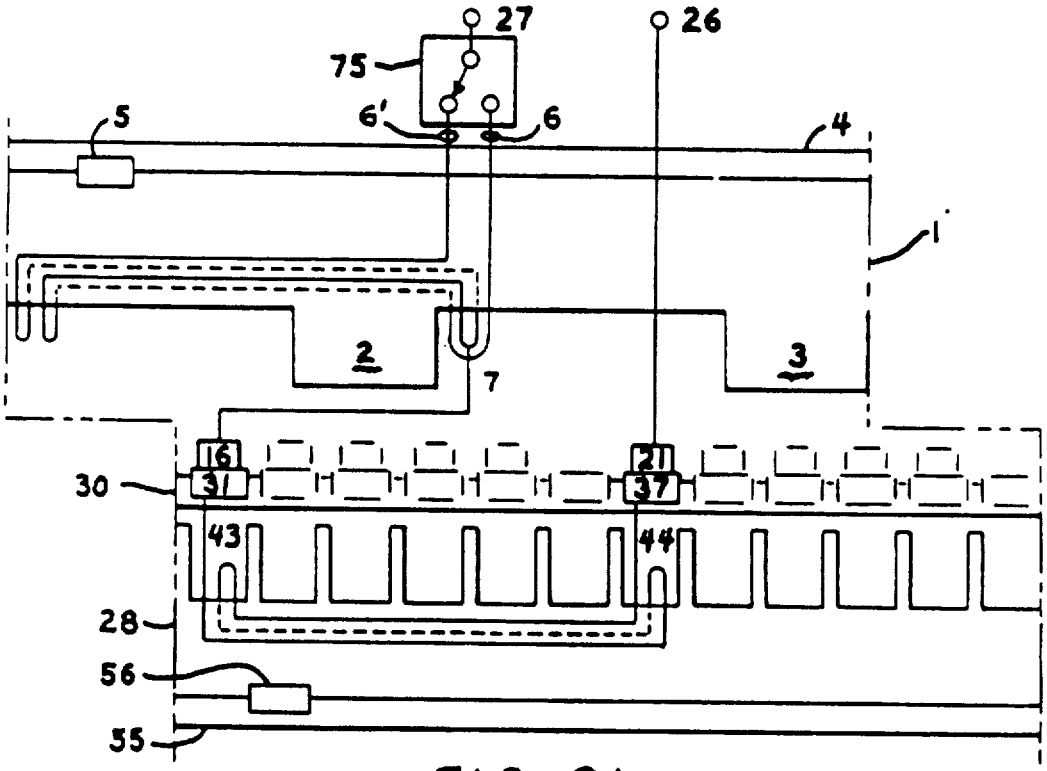
FIG. 21 is a representation of a reversible, series-field, electric motor in accordance with the present invention.

FIG. 21 is a representation of a reversible, series-field electrical motor in accordance with the present invention and the FIG. 1 assumptions and simplifications, plus the further simplifications for drawing purposes from FIG. 1 of showing only one of five of the stator windings which is made in two portions, one of six of the armature windings, the associated commutator segments and brushes, the stator magnetic yoke means 1, stator housing means 4, stator magnetic poles means 2 and 3, magnetic armature means 28, mechanical energy coupling means 55, and electrical energy connections means 26 and 27. The single pole double throw switch 75 controls the direction of motor armature torque or force generation by connecting terminal 27 to stator winding end 6 or stator winding end 6'.

Figure 22:
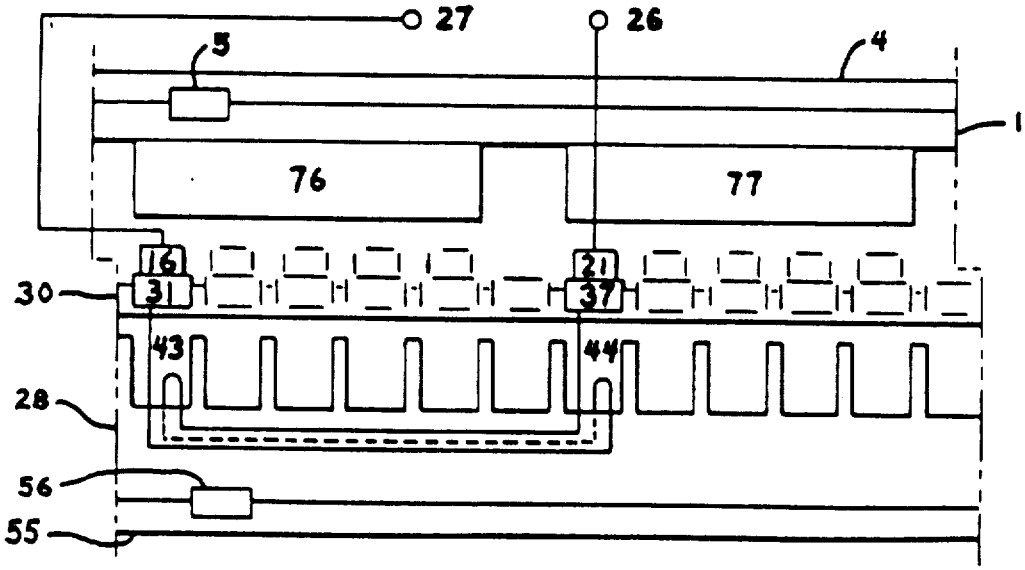
FIG. 22 is a representation of a permanent-magnet field electrical machine in accordance with the present invention.

FIG. 22 is a representation of a permanent magnet-field electrical machine in accordance with the present invention and the FIG. 1 assumptions and simplifications, plus the further simplifications for drawing purposes from FIG. 1 of showing only one of six of the armature windings, the associated commutator segments and brushes, the stator magnetic yoke means 1, stator housing means 4, magnetic armature means 28, mechanical energy coupling means 55, and electrical energy connections means 26 and 27. Stator poles 2 and 3 of FIG. 1 are replaced by permanent magnets 76 and 77 respectively in FIG. 22. The permanent magnets 76 and 77 are configured in a different geometry than the electrical steel poles 2 and 3 to take advantage of the differences in magnetic characteristics between permanent magnets and electrical steel. The magnets 76 and 77 are magnetized vertically in FIG. 22. For example, magnet 76 has a south pole facing downward toward armature 28, and a north pole abutting the yoke 1, magnet 77 has a north pole facing downward toward armature 28, and a south pole abutting the yoke 1. The pole faces of magnets 76 and 77 are wider than poles 2 and 3, but narrow enough to provide substantial air gaps between adjacent poles.

I claim as my invention:

1. An improved multiple windings electrical machine for converting between electrical and mechanical energy wherein said machine comprises an armature adapted for movement within the machine, a stator disposed adjacent the armature, said stator comprising a stator yoke and an integral number of stator pole pairs coupled to said stator yoke, the stator poles arranged in a side-by-side fashion in the direction of armature movement, adjacent stator poles being energized with opposite polarity magnetomotive force, the stator pole pairs being located adjacent the armature defining thereby an air gap therebetween, a plurality of open circuit armature windings disposed in the direction of armature movement, a commutator located on the armature comprising a plurality of segments disposed singularly in the direction of armature movement and arranged in pairs with corresponding segments one stator pole pitch apart, each segment of a pair coupled to a corresponding open end of a respective one of the open circuit armature windings, a plurality of brushes arranged in first and second groups per stator pole pair and said brushes being singularly disposed within each group in the direction of armature movement, the first brushes group containing one or more brushes, the second brushes group containing one or more brushes, said groups being singularly disposed and alternating first and second in the direction of armature movement, each brush of a group for contacting a portion of said commutator and said portion including no less than one [cummutator] *commutator* segment as the armature moves relative to the stator, and wherein, as the armature moves relative to the stator, certain ones of said commutator segments come out of contact with said brushes whereby respective ones of the open circuit armature windings become electrically isolated from said brushes, electrical terminal means coupled to said machine and adapted for receiving electrical energy for the machine and for delivering electrical energy from the machine, said machine including means for causing electrical current to flow in open circuit armature windings whose respective commutator segment pairs are contacted by a first brushes group brush on one segment and a second brushes group brush on the corresponding segment and wherein said current flow in the open circuit armature windings is interrupted as the respective commutator segments move out of contact with said brushes and producing thereby induced voltage between the two commutator segments of pairs coupled to said interrupted open circuit armature windings, the improvement comprising:

a plurality of energy disposal brushes in which each disposal brush is located between adjacent groups of brushes and adapted for contacting a commutator segment simultaneously with a brush of a group as the commutator segment comes out of contact with said brush of a group and for sole contact of said commutator segment for at least a portion of the movement of said segment between adjacent groups of brushes, and a half bridge circuit coupled between each energy disposal brush and the electrical terminal means, said half bridge circuit comprising a plurality of diodes arranged to be back-biased until the open circuit armature winding coupled to said commutator segment is interrupted and produces thereby induced voltage which forward-biases certain diodes of said half bridge circuit and of the half bridge circuit coupled to the adjacent energy disposal brush contacting the corresponding commutator segment coupled to said interrupted open circuit armature winding, and whereby electromagnetic energy contained in the interrupted ones of open circuit armature windings is thereby recovered and delivered to the electrical terminal means.

2. The improved machine of claim 1 wherein the brushes in each group are held and arranged in sequence between first and second group ends, and wherein the brushes at the first ends of the first brushes group are adapted in commutator contact portion position relative to the brushes at the first ends of the second brushes group, whereby as the armature moves, the current flow in the open circuit armature windings coupled to commutator segments contacted by such brushes is first interrupted at the brushes at the first ends of the first brushes group.

3. The improved machine of claim 2 wherein each energy disposal brush comprises first and second disposal brushes whereby the first disposal brush is adapted for contacting a commutator segment simultaneously with a first brushes group brush as the commutator segment comes out of contact with said first brushes group brush and for sole first disposal brush contact of said commutator segment for at least a portion of the movement of said segment between adjacent groups of brushes, and whereby the second disposal brush is adapted for contacting a commutator segment simultaneously with a second brushes group brush as the commutator segment comes out of contact with said second brushes group brush and for sole second disposal brush contact of said commutator segment for at least a portion of the movement of said segment between adjacent groups of brushes.

4. The improved machine of claim 3 comprising a plurality of half bridge circuits coupled between said first and second disposal brushes and the electrical terminal means, each half bridge circuit comprising a plurality of diodes arranged to be back-biased until the open circuit armature winding coupled to a commutator segment moving out of contact with a group brush is interrupted and produces thereby induced voltage which forward-biases certain diodes of said half bridge and of the half bridge coupled to the adjacent corresponding disposal brush contacting the corresponding commutator segment coupled to said interrupted open circuit armature winding, and whereby electromagnetic energy contained in the interrupted ones of open circuit armature windings is thereby recovered and delivered to the electrical terminal means.

5. The improved machine of claim 1 wherein said electrical terminal means includes positive and negative terminals, the improved machine further comprising:

a plurality of stator pole energizing stator windings arranged in an integral number of stator winding pairs;

a first stator winding of a pair coupled between a first brushes group brush and the positive terminal and the second stator winding of such stator winding pair coupled between the negative terminal and a second brushes group brush which corresponds with said first brushes group brush by being in the same stator pole pair brush groups and one stator pole pitch removed, whereby a portion of the energy contained in the interrupted ones of the open circuit armature windings is delivered to at least one of the first and second stator windings for aiding energization of said stator poles.

6. The improved machine of claim 5 wherein each energy disposal brush comprises first and second disposal brushes whereby the first disposal brush is adapted for contacting a commutator segment simultaneously with a first brushes group brush as the commutator segment comes out of contact with said first brushes group brush and for sole first disposal brush contact of said commutator segment for at least a portion of the movement of said segment between adjacent groups of brushes, and whereby the second disposal brush is adapted for contacting a commutator segment simultaneously with a second brushes group brush as the commutator segment comes out of contact with said second brushes group brush and for sole second disposal brush contact of said commutator segment for at least a portion of the movement of said segment between adjacent groups of brushes.

7. The improved machine of claim 2 comprising a plurality of stator pole energizing stator windings coupled between respective brushes in the first group of brushes and only one terminal of the electrical terminal means.

8. The improved machine of claim 7 wherein each energy disposal brush comprises first and second disposal brushes whereby the first disposal brush is adapted for contacting a commutator segment simultaneously with a first brushes group brush as the commutator segment comes out of contact with said first brushes group brush and for sole first disposal brush contact of said commutator segment for at least a portion of the movement of said segment between adjacent groups of brushes, and whereby the second disposal brush is adapted for contacting a commutator segment simultaneously with a second brushes group brush as the commutator segment comes out of contact with said second brushes group brush and for sole second disposal brush contact of said commutator segment for at least a portion of the movement of said segment between adjacent groups of brushes.

9. An improved multiple windings electrical machine for converting between electrical and mechanical energy wherein said machine comprises an armature adapted for movement within the machine, a stator disposed adjacent the armature, said stator comprising a stator yoke and an integral number of stator pole pairs coupled to said stator yoke, the stator poles arranged in a side-by-side fashion in the direction of armature movement, adjacent stator poles being energized with opposite polarity magnetomotive force, the stator pole pairs being located adjacent the armature defining thereby an air gap therebetween, a plurality of open circuit armature windings disposed in the direction of armature movement, a commutator located on the armature [comprising] *comprising* a plurality of segments disposed singularly in the direction of armature movement and arranged in pairs with corresponding segments one stator pole pitch apart, each segment of a pair coupled to a corresponding open end of a respective one of the open circuit armature windings, a plurality of brushes arranged in first and second groups per stator pole pair and said brushes being singularly disposed within each group in the direction of armature movement, the first brushes group containing one or more brushes, the second brushes group containing one or more brushes, said groups being singularly disposed and alternating first and second in the direction of armature movement, each brush of a group for contacting a portion of said commutator and said portion including no less than one commutator segment as the armature moves relative to the stator, and wherein, as the armature moves relative to the stator, certain ones of said commutator segments come out of contact with said brushes whereby respective ones of the open circuit armature windings become electrically isolated from said brushes, electrical terminal means coupled to said machine and adapted for receiving electrical energy for the machine and for delivering electrical energy from the machine, said machine including means for causing electrical current to flow in open circuit armature windings whose respective commutator segment pairs are contacted by a first brushes group brush on one segment and a second brushes group brush on the corresponding segment and wherein said current flow in the open circuit armature windings is interrupted as the respective commutator segments move out of contact with said brushes and producing thereby induced voltage between the two commutator segments of pairs coupled to said interrupted open circuit armature windings, and means for disposing of said interrupted armature windings electromagnetic energy, wherein the improvement comprises:

multiple stator windings per stator pole pair energizing stator poles wherein each winding includes a plurality of portions with two portions in individual series connections with positionally related individual pairs of first and second brushes group brushes, wherein the first portion winding is connected to a first brushes group brush and the second portion winding is connected to the second brushes group brush of said pair which second brushes group brush corresponds with said first brushes group brush by being in the same stator pole pair brush groups and by being one stator pole pitch removed, which series connections are energized by the same current flow as the open circuit armature windings, and which armature windings move with the armature and commutator with respect to said brushes and stator to convert between mechanical and electrical energy using the positional relationship between individual stator windings and individual armature windings established by the group brush pair positions when each group brush-contacted portion of the commutator includes at least one commutator segment, and which additionally allows adjusting currents to flow between adjacent commutator segments when each group brush-contacted portion of the commutator includes no less than two adjacent commutator segments, and which thereby achieves energy recovery and energy re-distribution when adjusting currents are interrupted as the respective commutator segments move to reduce to no less than one the number of commutator segments in each group brush-contacted portion of the commutator.

10. An improved multiple windings electrical machine for converting between electrical and mechanical energy wherein said machine comprises an armature adapted for movement within the machine, a stator disposed adjacent the armature, said stator comprising a stator yoke and an integral number of stator pole pairs coupled to said stator yoke, the stator poles arranged in a side-by-side fashion in the direction of armature movement, adjacent stator poles being energized with opposite polarity magnetomotive force, the stator pole pairs being located adjacent the armature defining thereby an air gap therebetween, a plurality of open circuit armature windings disposed in the direction of armature movement, a commutator located on the armature comprising a plurality of segments disposed singularly in the direction of armature movement and arranged in pairs with corresponding segments one stator pole pitch apart, each segment of a pair coupled to a corresponding open end of a respective one of the open circuit armature windings, a plurality of brushes arranged in first and second groups per stator pole pair and said brushes being singularly disposed within each group in the direction of armature movement, the first brushes group containing one or more brushes, the second brushes group containing one or more brushes, said groups being singularly disposed and alternating first and second in the direction of armature movement, each brush of a group for contacting a portion of said commutator and said portion including no less than one commutator segment as the armature moves relative to the stator, and wherein, as the armature moves relative to the stator, certain ones of said commutator segments come out of contact with said brushes whereby respective ones of the open circuit armature windings become electrically isolated from said brushes, electrical terminal means coupled to said machine and adapted for receiving electrical energy for the machine and for delivering electrical energy from the machine, said machine including means for causing electrical current to flow in open circuit armature windings whose respective commutator segment pairs are contacted by a first brushes group brush on one segment and a second brushes group brush on the corresponding segment and wherein said current flow in the open circuit armature windings is interrupted as the respective commutator segments move out of contact with said brushes and producing thereby induced voltage between the two commutator segments of pairs coupled to said interrupted open circuit armature windings, and means for disposing of said interrupted armature windings electromagnetic energy, wherein the improvement comprises:

the open circuit armature windings overlapping within one stator pole pair with active edges of each winding spaced one stator pole pitch apart, and with coupled commutator segment pairs being contacted by brushes in both first and second brushes groups per stator pole pair, and, as the armature moves, one segment of each segment pair per stator pole pair is regularly contacted by adjacent brush groups in adjacent stator pole pairs, thereby causing armature electromagnetic poles to by regularly incremented contrary to the armature movement, and the improved machine to regularly convert between electrical and mechanical energy.

11. An improved multiple windings electrical machine for converting between electrical and mechanical energy wherein said machine comprises an armature adapted for movement within the machine, a stator disposed adjacent the armature, said stator comprising a stator yoke and an integral number of stator pole pairs coupled to said stator yoke, the stator poles arranged in a side-by-side fashion in the direction of armature movement, adjacent stator poles being energized with opposite polarity magnetomotive force, the stator pole pairs being located adjacent the armature defining thereby an air gap therebetween, a plurality of open circuit armature windings disposed in the direction of armature movement, a commutator located on the armature comprising a plurality of segments disposed singularly in the direction of armature movement and arranged in pairs with corresponding segments one stator pole pitch apart, each segment of a pair coupled to a corresponding open end of a respective one of the open circuit armature windings, a plurality of brushes arranged in first and second groups per stator pole pair and said brushes being singularly disposed within each group in the direction of armature movement, the first brushes group containing one or more brushes, the second brushes group containing one or more brushes, said groups being singularly disposed and alternating first and second in the direction of armature movement, each brush of a group for contacting a portion of said commutator and said portion including no less than one commutator segment as the armature moves relative to the stator, and wherein, as the armature moves relative to the stator, certain ones of said commutator segments come out of contact with said brushes whereby respective ones of the open circuit armature windings become electrically isolated from said brushes, electrical terminal means coupled to said machine and adapted for receiving electrical energy for the machine and for delivering electrical energy from the machine, said machine including means for causing electrical current to flow in open circuit armature windings whose respective commutator segment pairs are contacted by a first brushes group brush on one segment and a second brushes group brush on the corresponding segment and wherein said current flow in the open circuit armature windings is interrupted as the respective commutator segments move out of contact with said brushes and producing thereby induced voltage between the two commutator segments of pairs coupled to said interrupted open circuit armature windings, and means for disposing of said interrupted armature windings electromagnetic energy, wherein the improvement comprises:

that the portion of said commutator contacted by first and second brushes group brushes includes all the commutator segments less one segment pair per stator pole pair, thereby increasing conducting paths available between the armature and the stator and facilitating the transfer of electrical current between said brushes and said commutator segments.

*12. A multiple windings electrical machine having at least one repeatable section, comprising:*

*a stator and an armature facing each other across an air gap and mounted for relative movement in at least one preselected direction;*

*the stator having, for each repeatable section, two stator magnetic poles of opposite polarity facing an air gap and arranged side-by-side in the direction of relative movement;*

*the armature having an armature magnetic structure and, for each repeatable section, multiple open circuit windings disposed from each other in the direction of relative movement and arranged to inductively link said structure;*

*means for simultaneously establishing electrical connections to a plurality of said armature windings on an individual basis, such that each of the armature windings can be energized independently of the other armature windings as said relative movement occurs;*

*means for causing current to flow in the electrical connection means and said plurality of windings to establish armature electromagnetic poles having the same pitch as the stator poles;*

*the stator and armature poles having a relative orientation at which a preselected change of magnetic energy per unit relative movement occurs;*

*the electrical connection means being constructed to substantially maintain said orientation by progressively establishing connection to unenergized windings of the armature and interrupting connection to other previously energized windings of the armature, thereby shifting the armature poles incrementally relative to the armature as said relative movement occurs so that the machine continuously converts between electrical and mechanical energy; and*

*energy disposal means coupled to the interrupted armature windings to recover energy from said windings as an induced voltage.*

*13. The machine of claim 12 wherein:*

*the electrical connection means is constructed and arranged to establish simultaneous electrical connection to a plurality of adjacent windings making up a majority of the armature windings per stator pole pair, and to shift the armature poles as said movement occurs by progressively connecting to unenergized windings of the armature and interrupting connection to previously energized windings of the armature.*

*14. The machine of claim 13 wherein:*

*the electrical connection means is further constructed and arranged to provide at least one disconnected armature winding at all times.*

*15. The machine of claim 14 wherein:*

*the electrical connection means establishes electrical connection simultaneously to all of the armature windings, less one per stator pole pair.*

*16. The machine of claim 13 wherein:*

*each armature winding extends between two ends;*

*the armature winding electrical connection means comprises:*

*a commutator carried by the armature and having a plurality of segments spaced in the direction of relative movement and arranged in pairs with the segments of each pair one stator pole pitch apart, each pair being coupled to opposite ends of one of the armature windings; and*

*a plurality of brushes arranged in first and second groups per stator pole pair to engage the commutator, such that pairs of brushes from different brush groups contact corresponding pairs of commutator segments in sequence as said relative movement occurs, and each pair of commutator segments temporarily comes out of contact with said brushes as it passes between brush groups for commutation; and*

*said means for causing current flow includes electrical terminal means connected across the first and second brush groups, respectively.*

*17. The machine of claim 16 which further comprises:*

*a plurality of energy disposal brushes in which each disposal brush is located between adjacent groups of brushes and arranged to contact a commutator segment simultaneously with a brush of one of the brush groups as the commutator segment comes out of contact with said brush of said group, and to contact the commutator segment by itself for at least a portion of the movement of said segment between adjacent groups of brushes; and*

*bridge circuit means coupled between each energy disposal brush and the electrical terminal means, said bridge circuit means comprising a plurality of diodes arranged to be back-biased until the open circuit armature winding coupled to said commutator segment is interrupted, whereupon a voltage induced in the winding forward-biases certain diodes of the bridge circuit means coupled to said interrupted armature winding, causing electromagnetic energy contained in the interrupted armature winding to be recovered and delivered to the electrical terminal means.*

*18. A multiple windings electrical machine having at least one repeatable section comprising:*

*a stator and an armature facing each other across an air gap and mounted for relative movement in at least one preselected direction;*

*the stator having, for each repeatable section, two stator magnetic poles of opposite polarity facing the air gap and arranged side-by-side in the direction of relative movement;*

*the armature having an armature magnetic structure and, for each repeatable section, multiple open circuit windings displaced from each other in the direction of relative movement and arranged to inductively link said structure;*

*first means for establishing electrical connection to a plurality of said armature windings;*

*means for causing current to flow in the electrical connection means and said plurality of windings to establish armature electromagnetic poles having the same pitch as the stator poles, said current flow means including electrical terminal means for external connection of the machine;*

*the stator and armature poles having a relative orientation at which a preselected change of magnetic energy per unit relative movement occurs;*

*the first connection means being constructed to substantially maintain said orientation by progressively establishing connection to unenergized windings of the armature and interrupting connection to other previously energized windings of the armature, thereby shifting the armature poles incrementally relative to the armature as said relative movement occurs;*

*second means for establishing electrical connection to at least one of the armature windings energized through the first connection means, and for maintaining said connection when the connection through the first means is interrupted by relative movement of the armature and the stator; and*

*energy disposal means coupled between the second connection means and the electrical terminal means to recover energy from the interrupted armature windings as an induced voltage.*

*19. The machine of claim 18 wherein:*

*each of said armature windings extends between a pair of opposite ends; and*

*the second connection means is constructed and arranged to establish electrical connections to both of said opposite ends.*

*20. The machine of claim 18 wherein:*

*the energy disposal means comprising bridge circuit means having a plurality of diodes arranged to be back-biased until the connection to an armature winding is interrupted, and for certain of the diodes to be forward biased by the induced voltage produced upon interruption, thereby coupling each interrupted armature winding to the terminal means.*

*21. The machine of claim 18 wherein:*

*each of the armature windings extends between two ends; and*

*the first connection means is constructed and arranged such that said interruption occurs at one end of each winding prior to occurring at the other end of said winding.*

*22. A multiple windings electrical machine having at least one repeatable section comprising:*

*a stator and an armature facing each other across an air gap and mounted for relative movement in at least one preselected direction;*

*the stator having, for each repeatable section, a stator magnetic structure and multiple stator winding means, said stator winding means being displaced from each other in the direction of relative movement to generate two stator magnetic poles of opposite polarity facing the air gap and arranged side-by-side in the direction of relative movement;*

*the armature having an armature magnetic structure and, for each repeatable section, multiple open circuit armature windings displaced from each other in the direction of relative movement and arranged to inductively link said structure;*

*first means for establishing simultaneous electrical connections to the stator winding means and to a plurality of the armature windings;*

*means for causing current to flow in the stator winding means and said plurality of armature windings through the first connection means, thereby generating said stator poles and establishing armature electromagnetic poles, respectively, the armature poles having the same pitch as the stator poles;*

*each of said stator winding means making up a magnetically interacting pair with at least one of said armature windings at a given time;*

*the stator and armature poles having a preselected relative orientation at which magnetic interaction occurs between said pairs; and*

*the first electrical connection means being constructed to substantially maintain said orientation by progressively establishing connection to unenergized armature windings and interrupting connection to other previously energized armature windings, thereby shifting the armature poles incrementally relative to the armature as said relative movement occurs so that the machine continuously converts between electrical and mechanical energy.*

*23. The machine of claim 22 which further comprises:*

*second means for establishing electrical connection to at least one of the armature windings energized through the first connection means, and for maintaining said connection when the connection through the first means is interrupted by relative movement of the armature and the stator; and*

*energy disposal means coupled between the second connection means and the electrical terminal means to recover energy.*

*24. The machine of claim 22 wherein:*

*the current flow means includes electrical terminal means for external connection of the machine;*

*each of the armature windings extends between two ends; and*

*each stator winding means comprises a first stator winding connectable between the terminal means and one end of an armature winding by the first connection means.*

*25. The machine of claim 24 wherein:*

*each stator winding means further comprises a second stator winding connectable between the terminal means and the other end of the armature winding by the first connection means.*

* * * * *

UNITED STATES PATENT AND TRADEMARK OFFICE

CERTIFICATE OF CORRECTION

PATENT NO. : Re. 32,674

DATED : May 24, 1988

INVENTOR(S) : John T.R. Wilson

It is certified that error appears in the above-identified patent and that said Letters Patent is hereby corrected as shown below:

Column 23, line 3, delete "disposed" and substitute therefor --displaced--.

Signed and Sealed this

Fourth Day of October, 1988

*Attest:*

*Attesting Officer*

DONALD J. QUIGG

*Commissioner of Patents and Trademarks*